United States Patent
Zhong (10) Patent No.: US 8,559,497 B2
(45) Date of Patent: Oct. 15, 2013

(54) ADAPTATION OF DELAY LINE FEEDBACK EQUALIZER

(75) Inventor: Lizhi Zhong, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 294 days.

(21) Appl. No.: 13/046,972

(22) Filed: Mar. 14, 2011

(65) Prior Publication Data

US 2012/0236925 A1 Sep. 20, 2012

(51) Int. Cl.
*H03H 7/30* (2006.01)

(52) U.S. Cl.
USPC ........... 375/233; 375/232; 375/231; 375/230; 375/229; 375/285; 375/254; 375/262; 375/265

(58) Field of Classification Search
USPC ......... 375/233, 232, 231, 230, 229, 285, 254, 375/262, 265
See application file for complete search history.

(56) References Cited

U.S. PATENT DOCUMENTS

| | | | |
|---|---|---|---|
| 5,369,668 A | 11/1994 | Yamamoto | 375/14 |
| 2002/0154247 A1* | 10/2002 | Ghosh et al. | 348/614 |
| 2011/0096824 A1* | 4/2011 | Agazzi et al. | 375/233 |

OTHER PUBLICATIONS

James Buckwalter and Ali Hajimiri, Oct. 2004, IEEE, vol. 39(10), pp. 1659-1670.*

* cited by examiner

*Primary Examiner* — Zewdu Kassa (74) *Attorney, Agent, or Firm* — Christopher P. Maiorana, PC (57) ABSTRACT

An apparatus including an adder, a delay line, and a first detector. The adder may be configured to generate an input signal in response to a received signal and a feedback signal. The feedback signal may include a contribution from each of a plurality of delayed versions of the input signal. The contribution from each of the plurality of delayed versions of the input signal may be determined by a respective weight value. The delay line may be configured to generate the plurality of delayed versions of the input signal. The first detector may be configured to recover a data sample from the input signal in response to a clock signal.

20 Claims, 11 Drawing Sheets

ADAPTATION OF DELAY LINE FEEDBACK EQUALIZER

FIELD OF THE INVENTION

The present invention relates to the communications field generally and, more particularly, to a method and/or apparatus for implementing adaptation in a delay line feedback equalizer.

BACKGROUND OF THE INVENTION

Inter symbol interference (ISI) resulting from a communications channel can greatly reduce an eye opening at an input of a receiver. A decision feedback equalizer (DFE) can be used to reduce ISI. However, reflections in the communications channel can cause ISI in a wide range of symbols. To reduce ISI in the wide range of symbols, the DFE needs a large number of taps.

At higher data rates (i.e., above 17 Gbps), implementation of a digital decision feedback equalizer (DFE) becomes increasingly difficult. One reason for the difficulty is that ensuring the first tap feedback is stable within one symbol interval becomes increasingly challenging, because the symbol interval gets smaller as the data rate increases. Unrolling the DFE helps to relax the timing constraint. However, unrolling is done at the cost of the number of capture latches, which increases exponentially with the number of DFE taps. A linear equalizer (LE), such as a feed forward equalizer (FFE) or a continuous time linear equalizer, could be used as an alternative, but such linear equalizers can only handle channels without reflections.

It would be desirable to have an equalizer that can be used on higher data rate channels with reflections.

SUMMARY OF THE INVENTION

The present invention concerns an apparatus including an adder, a delay line, and a first detector. The adder may be configured to generate an input signal in response to a received signal and a feedback signal. The feedback signal may include a contribution from each of a plurality of delayed versions of the input signal. The contribution from each of the plurality of delayed versions of the input signal may be determined by a respective weight value. The delay line may be configured to generate the plurality of delayed versions of the input signal. The first detector may be configured to recover a data sample from the input signal in response to a clock signal.

The objects, features and advantages of the present invention include providing adaptation of delay line feedback equalizer that may (i) allow feedback within one symbol interval to be provided more easily, (ii) consume less power, (iii) control many tap weights so as to equalize channels with reflections, and/or (iv) provide adaptation that is simple to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
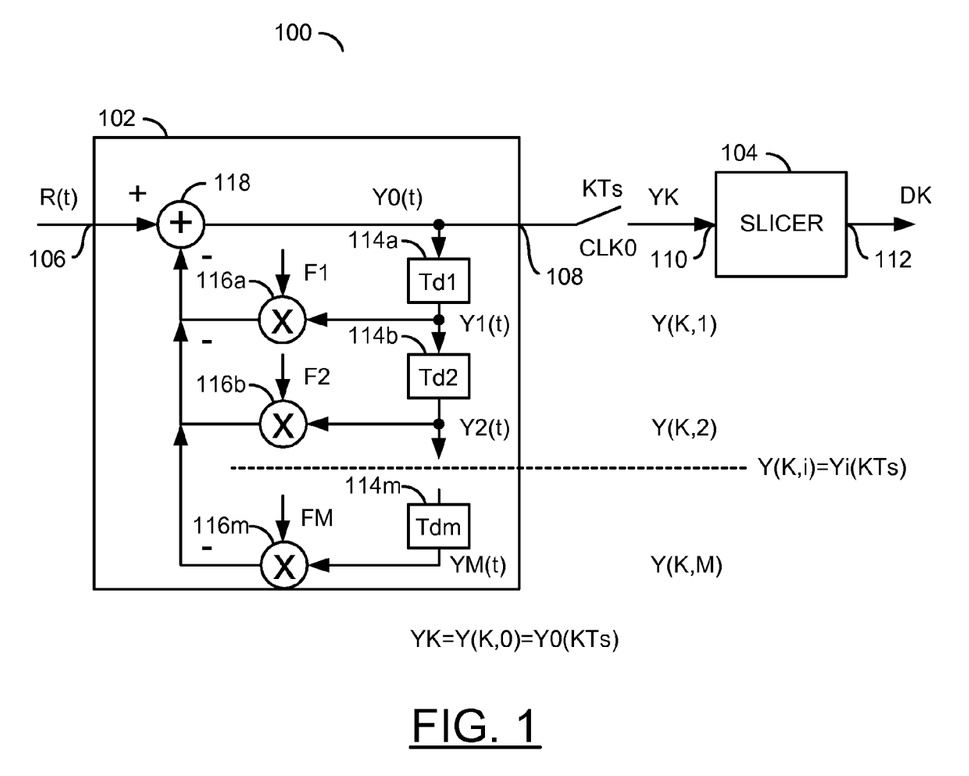
FIG. 1 is a block diagram illustrating a circuit in accordance with an example 1T embodiment of the present invention.

Referring to FIG. 1, a block diagram of a circuit 100 is shown illustrating an example implementation of a delay line feedback equalizer (DLFE) in accordance with an example embodiment of the present invention. In one example, the circuit 100 may comprise a block (or circuit) 102 and a block (or circuit) 104. The circuits 102 and 104 may represent modules and/or blocks that may be implemented as hardware, software, a combination of hardware and software, or other implementations. In one example, the circuit 102 may implement a delay line configured to generate a plurality of weighted feedback signals. The circuit 104 may implement a detector. In one example, the circuit 104 may be implemented as a slicer. However, other types of detectors (e.g., symbol detector, bit slicer, etc.) may be implemented accordingly to meet the design criteria of a particular implementation.

The circuit 102 may have an input 106 that may receive a signal (e.g., R(t)) and an output 108 that may present a signal (e.g., Y0(t)). The signal Y0(t) may be sampled in response to a clock signal (e.g., CLK0) to generate a digital sample (e.g., Y(K,0)). A sampling period (e.g., Ts) is generally determined by a frequency of the clock signal CLK0. The sample Y(K,0) may be referred to simply as YK. The digital sample may be presented to an input 110 of the circuit 104. The circuit 104 may have an output 112 that may present a signal (e.g., DK). The signal DK may comprise data (e.g., symbols, bits, etc.) recovered from the received signal R(t).

In one example, the circuit 102 may comprise a plurality of delay elements 114a-114m configured to generate a plurality of delayed versions (e.g., Y1(t), Y2(t), ..., YM(t)) of the signal Y0(t). In one example, each of the delay elements 114a-114m may be configured to provide a delay (e.g., Td1, Td2, ..., Tdm) equal to the sampling period Ts. However, the delays Td1, Td2, ..., Tdm may vary from the sampling period Ts and/or each other to meet the design criteria of a particular implementation. The signals Y1(t), Y2(t), ..., YM(t) may be weighted and subtracted from the received signal R(t). In one example, the weighting may be accomplished using a plurality of multipliers 116a-116m and respective tap weights (e.g., F1, F2, . . . , FM). The weighted signals may be subtracted from the received signal R(t), in one example, using an adder 118.

The circuit 100 may be implemented similarly to a digital decision feedback equalizer (DFE) with the exception that instead of feeding back decisions, delayed versions of the signal Y0(t) may be fed back. Because no decision needs to be made to be fed back, the feedback latency is greatly reduced. In one example, inductors may be used to implement the delay elements 114a-114m. The use of inductors to provide the delay may become more attractive as the data rate increases, since the size of the inductors may be reduced. Alternative ways to implement the delay elements 114a-114m may include, but are not limited to the use of active devices and/or transmission lines. Since many taps may be implemented, the circuit 100 may provide an equalizer that has more degrees of freedom. More degrees of freedom may allow the circuit 100 to equalize not only smooth channels, but also channels with reflections within the range covered by the delay elements 114a-114m.

Figure 2:
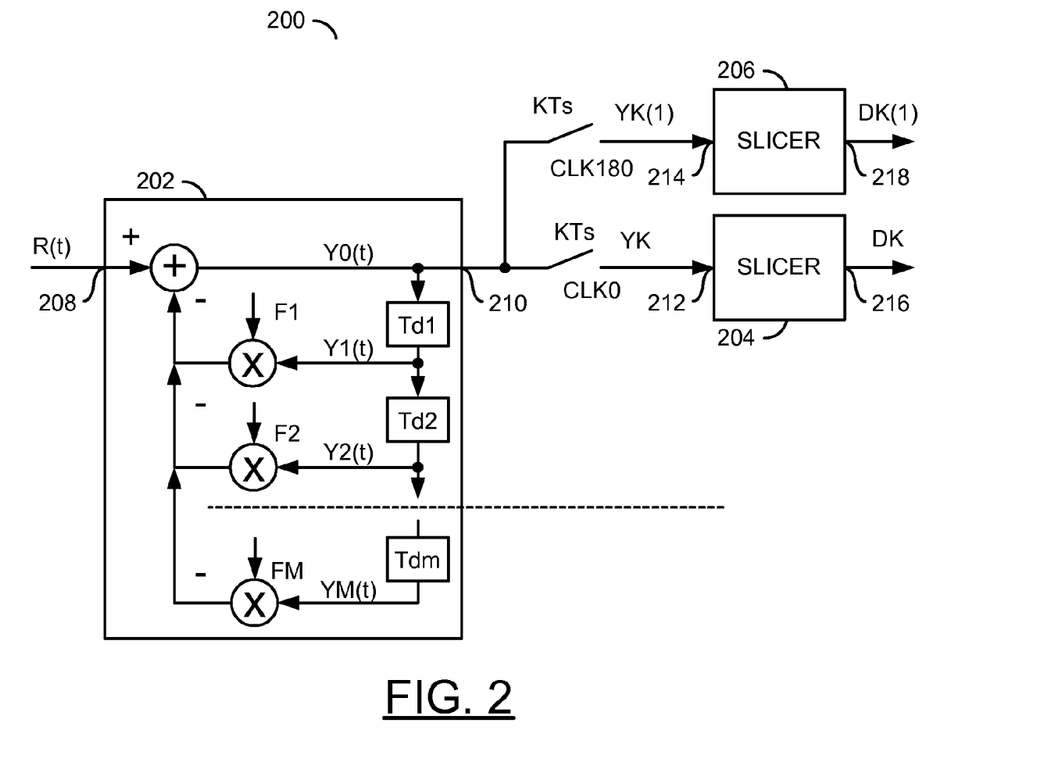
FIG. 2 is a block diagram illustrating a circuit in accordance with an example 2T embodiment of the present invention.

Referring to FIG. 2, a block diagram of a circuit 200 is shown illustrating an example of a delay line feedback equalizer (DLFE) with a 2T slicer implemented in accordance with another example embodiment of the present invention. Although the circuit 200 is illustrated including a 2T slicer, it will be apparent to those of ordinary skill in the field of the invention that the circuit 200 may also be implemented accordingly with an nT slicer, where n is an integer greater than 1. In one example, the circuit 200 may comprise a block (or circuit) 202, a block (or circuit) 204, and a block (or circuit) 206. The circuits 202-206 may represent modules and/or blocks that may be implemented as hardware, software, a combination of hardware and software, or other implementations. In one example, the circuit 202 may be implemented similarly to the circuit 102 (described above in connection with FIG. 1). The circuits 204 and 206 may implement detectors. In one example, the circuits 204 and 206 may be implemented as slicers. However, other types of detectors (e.g., symbol detectors, bit slicers, etc.) may be implemented accordingly to meet the design criteria of a particular implementation.

The circuit 202 may have an input 208 that may receive the signal R(t) and an output 210 that may present the signal Y0(t). The signal Y0(t) may be sampled in response to a first clock signal (e.g., CLK0) and a second clock signal (e.g., CLK180). The clock signals CLK0 and CLK180 may be different phases of the same clock. In one example, the clock signals CLK0 and CLK180 may have a phase difference of 180 degrees. When the circuit 200 is implemented in an nT version, the circuit 200 may comprise n slicers and n clock signals. The n clock signals may be implemented, in one example, having different phases. In one example, each of the n clock signals may be implemented having a phase difference of 360/n degrees. However, other phase differences may be implemented to meet the design criteria of a particular implementation.

The signal CLK0 may be used to generate a first digital sample (e.g., YK). The signal CLK180 may be used to generate a second digital sample (e.g., YK(1)). The implementation of two detectors generally allows a reduction in the frequency of the sampling clock. For example, a period of the clock signals CLK0 and CLK180 is generally twice the sampling period Ts. In one example, the sampling time for a current symbol may be KTs, where K is an integer. In a 2T slicer, K is always an odd number (or always an even number) because the sampling frequency is 2Ts. The first digital sample YK may be presented to an input 212 of the circuit 204 and the second digital sample YK(1) may be presented to an input 214 of the circuit 206. When the delay between the signal CLK180 and the signal CLK0 is equal to Td1, the second digital sample YK(1) may be equal to Y(K,1). Otherwise, YK(1) may be different from Y(K,1). The circuit 204 may have an output 216 that may present a signal (e.g., DK). The circuit 206 may have an output 218 that may present a signal (e.g., DK(1)). The signals DK and DK(1) may comprise data (e.g., symbols, bits, etc.) recovered from the received signal R(t).

Figure 3:
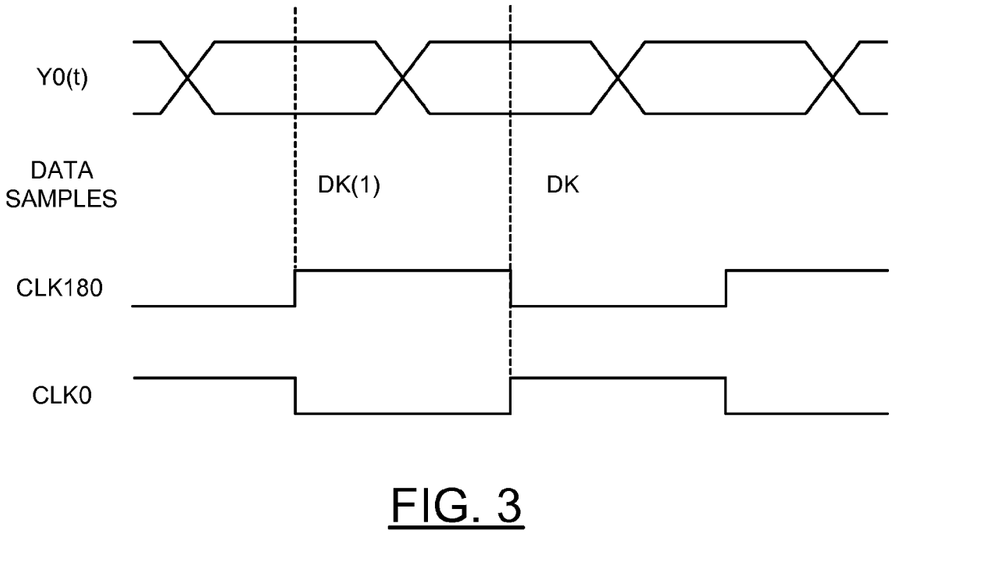
FIG. 3 is a timing diagram illustrating an example operation of the circuit of FIG. 2.

Referring to FIG. 3, a timing diagram is shown illustrating an example operation of the circuit 200 implemented with a 2T slicer. In one example, the signal CLK180 may lead the signal CLK0.

Figure 4:
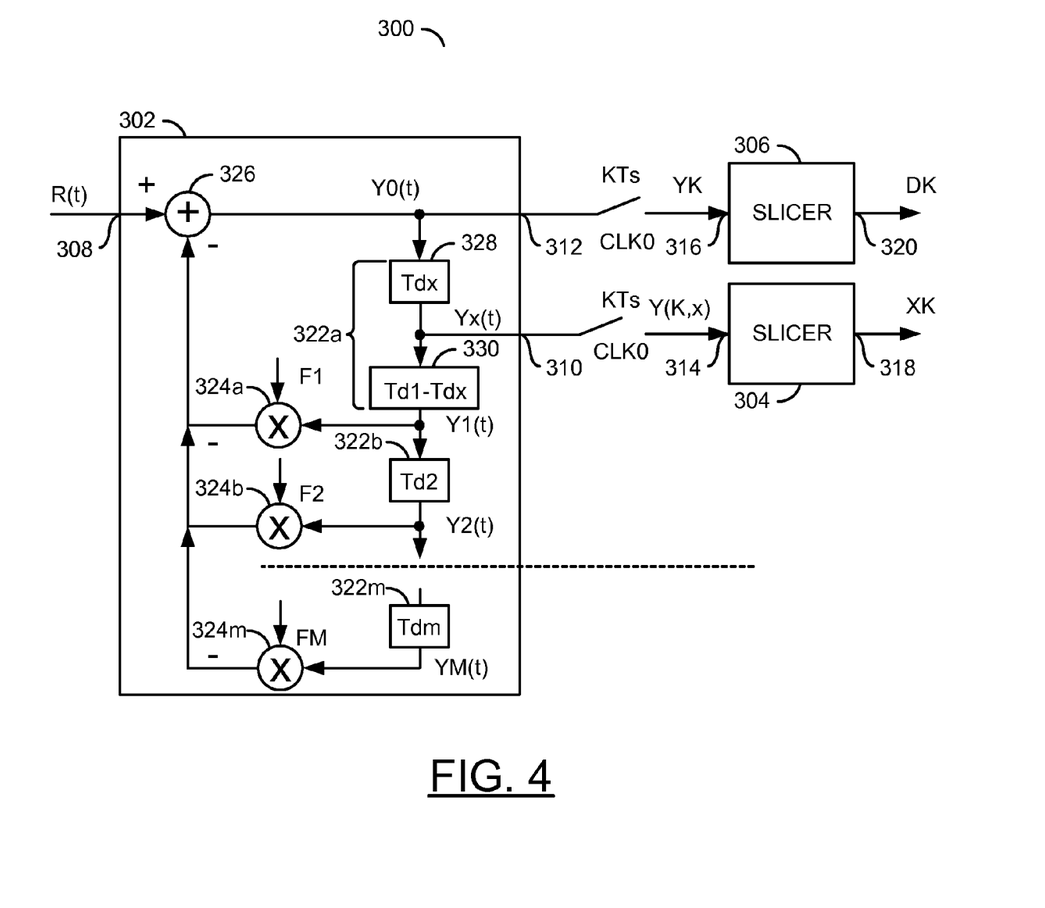
FIG. 4 is a block diagram illustrating a circuit in accordance with still another example embodiment of the present invention.

Referring to FIG. 4, a block diagram of a circuit 300 is shown illustrating another example implementation of a delay line feedback equalizer (DLFE) in accordance with another example embodiment of the present invention. The circuit 300 implemented in accordance with the present invention may facilitate new methods of distributing clocks and new clock and data recovery (CDR) techniques. For example, bang-bang CDR typically uses two clocks that are 90 degrees apart and an extra capture latch for obtaining a crossing sample. With a small modification to the delay line feedback equalizer illustrated in FIG. 2, two output signals, each a half symbol interval apart, may be sent to the capture latches to get the data sample and a crossing sample, while implementing only one sampling clock. For example, two delay elements, each having a delay of one-half of a symbol interval, may be used to replace the first delay element of the delay line. In one example, the circuit 300 may be used with a full rate bang bang clock data recovery (CDR) circuit.

In one example, the circuit 300 may comprise a block (or circuit) 302, a block (or circuit) 304, and a block (or circuit) 306. The circuits 302-306 may represent modules and/or blocks that may be implemented as hardware, software, a combination of hardware and software, or other implementations. In one example, the circuit 302 may implement a delay line configured to generate a plurality of weighted feedback signals. The circuits 304 and 306 may implement detectors. In one example, the circuits 304 and 306 may be implemented as slicers. However, other types of detectors (e.g., symbol detectors, bit slicers, etc.) may be implemented accordingly to meet the design criteria of a particular implementation.

The circuit 302 may have an input 308 that may receive a signal (e.g., R(t)), an output 310 that may present a signal (e.g., Yx(t)), and an output 312 that may present a signal (e.g., Y0(t)). The signal Y0(t) may be sampled in response to a clock signal (e.g., CLK0) to generate a digital sample (e.g., YK). The signal Yx(t) may be sampled in response to the clock signal CLK0 also to generate a digital sample (e.g., Y(K,x)). A sampling time (e.g., KTs) is generally determined by a frequency of the clock signal CLK0. The sample Y(K,x) may be presented to an input 314 of the circuit 304. The sample YK may be presented to an input 316 of the circuit 306. The circuit 304 may have an output 318 that may present a signal (e.g., XK). The signal XK may comprise a crossing sample for the received signal R(t). The circuit 306 may have an output 320 that may present a signal (e.g., DK). The signal DK may comprise data (e.g., symbols, bits, etc.) recovered from the received signal R(t).

In one example, the circuit 302 may comprise a plurality of delay elements 322a-322m configured to generate a plurality of delayed versions (e.g., Y1(t), Y2(t), . . . , YM(t)) of the signal Y0(t). In one example, each of the delay elements 322a-322m may be configured to provide a delay (e.g., Td1, Td2, . . . , Tdm). In one example, the delays Td1, Td2, . . . , Tdm may be equal to the sampling period Ts. However, the delays Td1, Td2, ..., Tdm may vary from the sampling period Ts and/or each other to meet the design criteria of a particular implementation. The signals Y1(t), Y2(t), ..., YM(t) may be weighted and subtracted from the received signal R(t). In one example, the weighting may be accomplished using a plurality of multipliers 324a-324m and respective tap weights (e.g., F1, F2, ..., FM). The weighted signals may be subtracted from the received signal R(t), in one example, using an adder 326.

The delay element 322a may be further configured to provide an output in addition to the signal Y1(t). In one example, the delay element 322a may be implemented as two delay elements 328 and 330. The delay element 328 may have a first delay (e.g., Tdx). The delay element 330 may have a second delay (e.g., Td1-Tdx). The delay element 328 may have an input that may receive the signal Y0(t) and an output that may present the signal Yx(t). The delay element 330 may have an input that may receive the signal Yx(t) and an output that may present the signal Y1(t). In one example, each delay may be one-half of the symbol interval Ts (e.g., Td1=Ts and Tdx=Ts/2). However, other delays may be implemented accordingly to meet the design criteria of a particular implementation. In one example, each of the circuits 304 and 306 may be implemented as an nT slicer.

Figure 5:
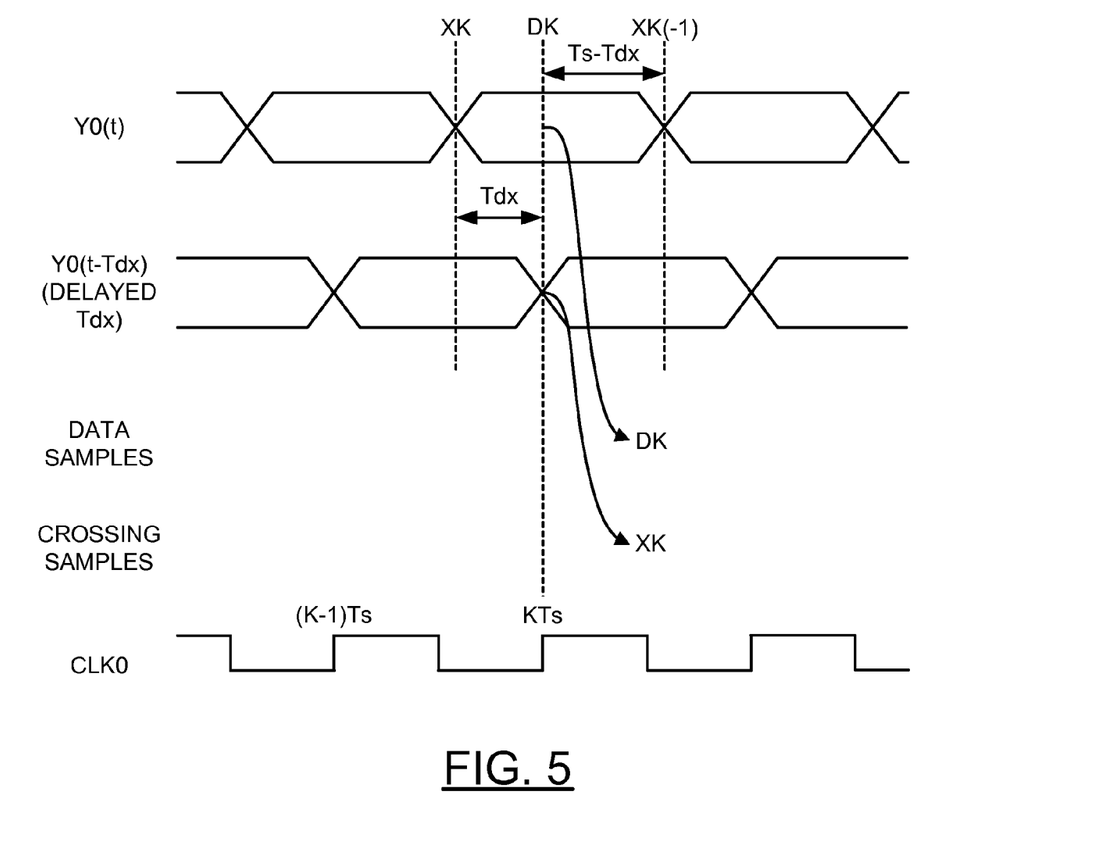
FIG. 5 is a timing diagram illustrating an example operation of the circuit of FIG. 4.

Referring to FIG. 5, a timing diagram is shown illustrating an example operation of the circuit 300 of FIG. 4 in accordance with an example embodiment of the present invention.

Figure 6:
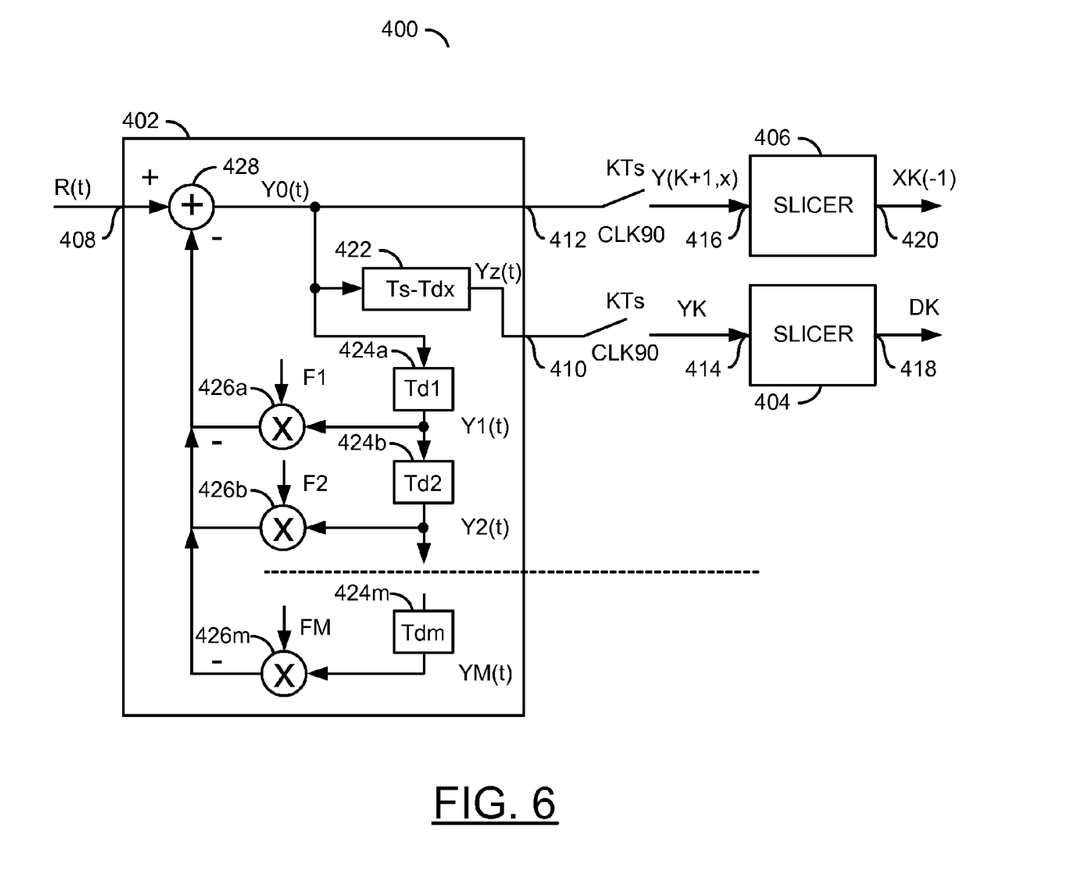
FIG. 6 is a block diagram illustrating a circuit in accordance with yet another example embodiment of the present invention.

Referring to FIG. 6, a block diagram of a circuit 400 is shown illustrating another example implementation of a delay line feedback equalizer (DLFE) in accordance with another example embodiment of the present invention. The circuit 400 may be implemented similarly to the circuit 300 with the exception that instead of implementing the first delay element as two delay elements, an additional delay element having a delay that is less than a symbol period (e.g., Ts-Tdx) may be implemented. In one example, the circuit 400 may be used with a full rate bang bang clock data recovery (CDR) circuit.

In one example, the circuit 400 may comprise a block (or circuit) 402, a block (or circuit) 404, and a block (or circuit) 406. The circuits 402-406 may represent modules and/or blocks that may be implemented as hardware, software, a combination of hardware and software, or other implementations. In one example, the circuit 402 may implement a delay line configured to generate a plurality of weighted feedback signals. The circuits 404 and 406 may implement detectors. In one example, the circuits 404 and 406 may be implemented as slicers. However, other types of detectors (e.g., symbol detectors, bit slicers, etc.) may be implemented accordingly to meet the design criteria of a particular implementation.

The circuit 402 may have an input 408 that may receive a signal (e.g., R(t)), an output 410 that may present a signal (e.g., Yz(t)), and an output 412 that may present a signal (e.g., Y0(t)). The signal Yz(t) may implement a delayed version of the signal Y0(t). The signal Yz(t) may be sampled in response to a clock signal (e.g., CLK90) to generate a digital sample (e.g., YK). The signal Y0(t) may be sampled also in response to the clock signal CLK90 to generate a digital sample (e.g., Y(K+1,x)). A time period (e.g., KTs) is generally determined by a frequency of the clock signal CLK90. By sampling the signal Y0(t) in response to the clock signal CLK90, the input to the slicer 406 may be equivalent to Yx((K+1)Ts), or Y(K+1,x). The sample YK may be presented to an input 414 of the circuit 404. The sample Y(K+1,x) may be presented to an input 416 of the circuit 406. The circuit 404 may have an output 418 that may present a signal (e.g., DK). The signal DK may comprise data (e.g., symbols, bits, etc.) recovered from the received signal R(t). The circuit 406 may have an output 420 that may present a signal (e.g., XK(-1)). The signal XK(-1) may comprise a crossing sample for the received signal R(t).

In one example, the circuit 402 may comprise a delay element 422 configured to generate the signal Y0(t) and a plurality of delay elements 424a-424m configured to generate a plurality of delayed versions (e.g., Y1(t), Y2(t), ..., YM(t)) of the signal Y0(t). In one example, each of the delay elements 424a-424m may be configured to provide a delay (e.g., Td1, Td2, ..., Tdm) equal to the sampling period Ts. However, the delays Td1, Td2, ..., Tdm may vary from the sampling period Ts and/or each other to meet the design criteria of a particular implementation. The signals Y1(t), Y2(t), ..., YM(t) may be weighted and subtracted from the received signal R(t). In one example, the weighting may be accomplished using a plurality of multipliers 426a-426m and respective tap weights (e.g., F1, F2, ..., FM). The weighted signals may be subtracted from the received signal R(t), in one example, using an adder 428.

The delay element 422 may have a delay that is less than a symbol period (e.g., Ts-Tdx). The delay element 422 may have an input that may receive the signal Y0(t) and an output that may present the signal Yz(t). In one example, the element 422 may provide a delay that may be one-half of the symbol interval Ts (e.g., Tdx=Ts/2). However, other delays may be implemented accordingly to meet the design criteria of a particular implementation.

Figure 7:
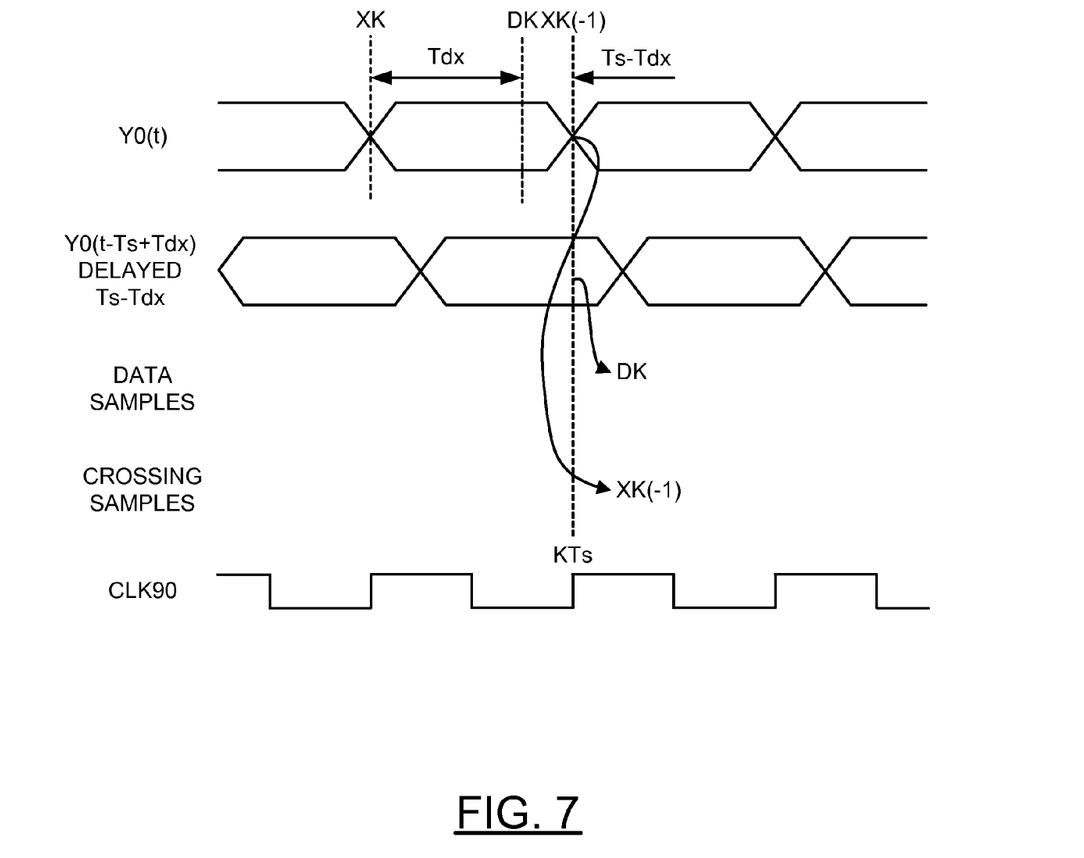
FIG. 7 is a timing diagram illustrating example operation of the circuit of FIG. 6.

Referring to FIG. 7, a diagram is shown illustrating timing relationships between example clock signals CLK0 and CLK90 and an example delay parameter of FIG. 6. In one example, the clock signal CLK90 may lag the clock signal CLK0.

Figure 8:
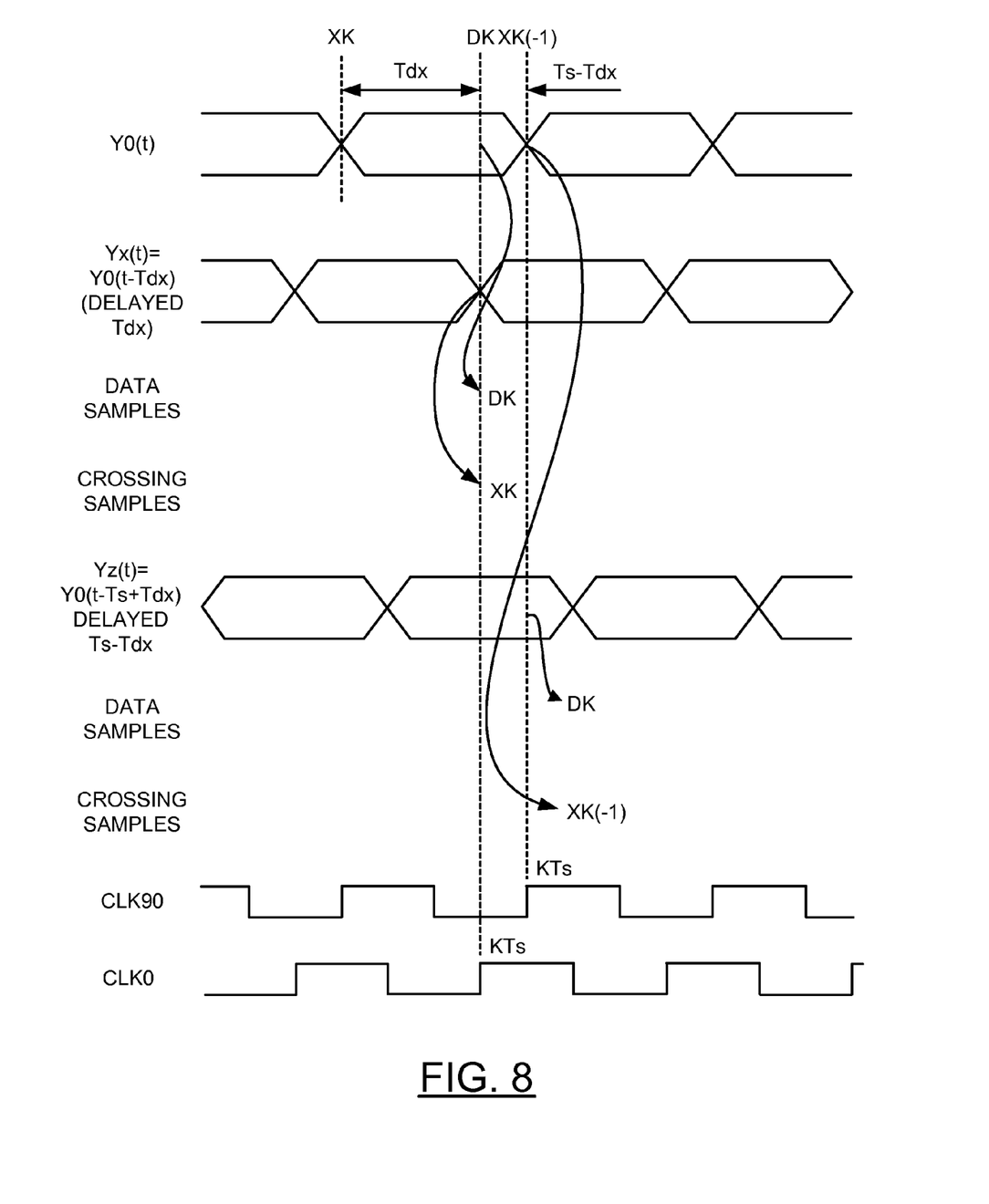
FIG. 8 is a timing diagram illustrating a comparison of relationships illustrated in FIGS. 5 and 7.

Referring to FIG. 8, a timing diagram is shown illustrating a comparison of the timing relationships illustrated in FIG. 5 with the timing relationships illustrated in FIG. 7.

Figure 9:
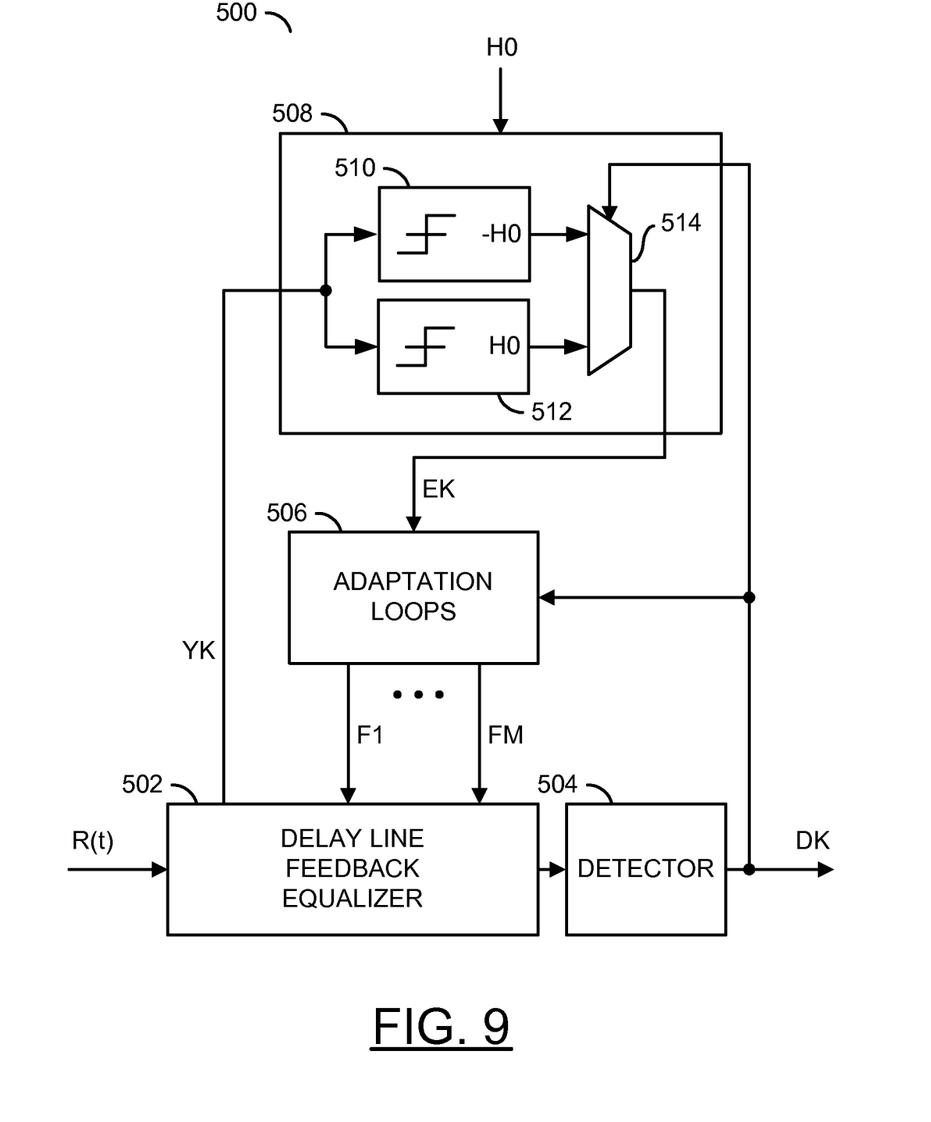
FIG. 9 is a diagram illustrating an adaptation loop in accordance with embodiments of the present invention.

Referring to FIG. 9, a diagram of a circuit 500 is shown illustrating a system model in accordance with an example embodiment of the present invention. In one example, the circuit 500 may comprise a block (or circuit) 502, a block (or circuit) 504, a block (or circuit) 506, and a block (or circuit) 508. The circuits 502-508 may represent modules and/or blocks that may be implemented as hardware, software, a combination of hardware and software, or other implementations. In one example, the circuit 502 may implement a delay line feedback equalizer. The circuit 504 may implement one or more detectors (or slicers). The circuit 506 may implement one or more adaption loops. The circuit 508 may implement an error signal generator.

The circuit 502 may have a first input that may receive the signal R(t), a second input that may receive a number of signals F1, F2, ..., FM, a first output that may present the signal YK, and a second output that may present the signal YK. The signals F1, F2, ..., FM may comprise tap weights. The circuits 502 and 504 may be implemented using any of the circuits 100, 200, 300, and 400 (described above in connection with FIGS. 1-4). The circuit 504 may comprise any of the slicer circuits 104, 204, 206, 304, 306, 404 and 406. The circuit 504 may have a first input that may receive samples YK and an output that may present the signal DK. The circuit 506 may have a first input that may receive the signal DK, a second input that may receive a signal (e.g., EK), and an output that may present the signals F1, F2, ..., FM. The circuit 508, may have a first input that may receive the signal YK, a second input that may receive the signal DK, a third input that may receive a signal H0, and an output that may present the signal EK. The signal EK may implement an error signal. The signal H0 may comprise a target level for a receiver in which the circuit 500 is implemented. In one example, the signal H0 may be used to set a threshold of the circuit 508.

In one example, the circuit 508 may implement an error signal generating circuit. In one example, the circuit 506 may comprise a block (or circuit) 510, a block (or circuit) 512, and a block (or circuit) 514. The circuit 510 may be implemented as a capture latch. The circuit 512 may be implemented as a capture latch. The circuit 514 may be implemented as a multiplexer. The circuits 510 and 512 may have crossing latch thresholds of −H0 and H0, respectively, where H0 represents a target level of the receiver circuit containing the circuit 500.

The signal YK may be presented to an input of the circuit 510 and an input of the circuit 512. An output of the circuit 510 may be presented to a first input of the circuit 514. An output of the circuit 512 may be presented to a second input of the circuit 514. A control input of the circuit 514 may receive the signal DK from the circuit 502. The circuit 514 may have an output that may present the signal EK.

The tap weights F1, F2, ..., FM may be adapted to equalize different channels. Ideally, an ith tap weight (e.g., Fi) may be set to Pi/P0, where Pi represents the magnitude of the pulse response at the ith symbol interval and P0 represents the main cursor of the pulse response. However, the pulse response is often not known in advance, so blind adaptation may be desired. In addition, circuit bandwidth limitations and noise may make the optimal tap weights different from what is stated above.

An adaptation algorithm may be derived from the system model illustrated by the circuit 500. In one example, the delay line feedback equalizer 502 and the detector 504 may be implemented similarly to the circuit 100 of FIG. 1. The delay line feedback equalizer 502 may be modeled using the following equation:

$$YK = RK - F1*Y(K,1) - F2*Y(K,2) - \ldots - FM*Y(K,M),$$

where RK represents the input signal R(t), sampled at the kth Ts, YK is the input signal to the detector, Y(K,i) is signal at the output of the ith delay element, sampled at the kth Ts, and Ts represents the sampling period. The signal EK may be generated, in one example, as YK−H0*DK. To minimize the mean squared error (MSE), the gradient may be set as EK*Y(K,i). However, other optimization goals may be used, which may result in different gradients. A simplified version of the above example may be illustrated by sign-sign least means square (LMS), which uses only the sign of the signals. Implementing sign-sign LMS, the gradient may be expressed as sign(EK)*sign(Y(K,i)). Given an implementation where the sign of Y(K,i) is the same as the sign of D(K), the decision, the gradient may be expressed as sign(EK)*sign(DK).

For an ideal delay line, Y(K,i)=Y(K−i). As a result, the above assumption holds. However, bandwidth (BW) limitations and noise introduced by the circuit may make Y(K,i) different from Y(K−i). The hope is that Y(K,i) and Y(K−i) are not so significantly different, that the respective signs are reversed. Guidelines may be established that an implementation must be good enough to ensure the sign is not reversed, (e.g., sign(Y(K,i))=sign(Y(K−i))=sign(D(Ki))). This is the adaptation for the tap weights used by the delay line feedback equalizer 502. The implementation cost may be similar to that of a standard DFE, which is being done in many existing designs. In one example, adaptation of the delay line feedback equalizer tap weights F1-FM may be implemented to meet the following criteria:

$$y_k = r_k - \sum_{i=1}^{m} f_i \cdot y_{ki}$$

$$e_k = y_k - h_0 \cdot d_k = r_k - \sum_{i=1}^{m} f_i \cdot y_{ki} - h_0 \cdot d_k$$

$$\Delta_i = e_k \cdot y_{ki}$$

Assuming sgn($y_{ki}$)=sgn($d_{k-i}$), $$\Delta_i = \text{sgn}(e_k) \cdot \text{sgn}(y_{ki}) = \text{sgn}(e_k) \cdot \text{sgn}(d_{k-i})$$

Figure 10:
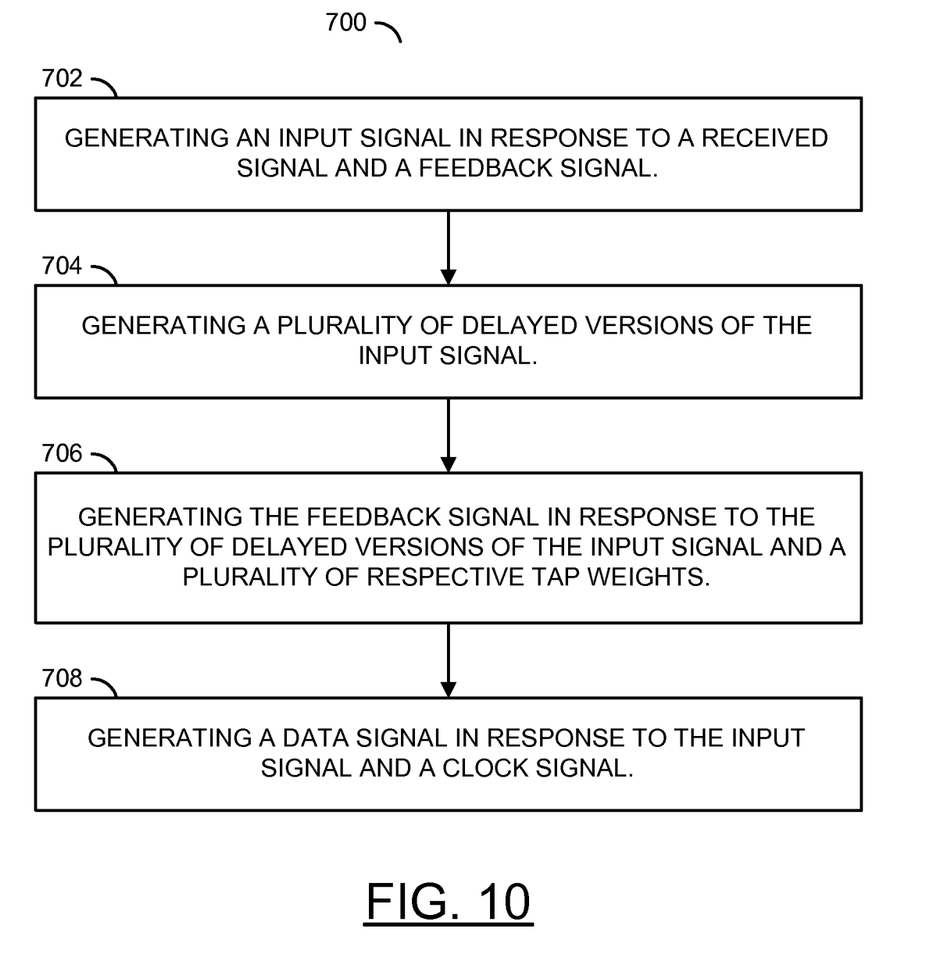
FIG. 10 is a flow diagram illustrating a equalization process in accordance with an example embodiment of the present invention.

Referring to FIG. 10, a flow diagram is shown illustrating an equalization process (or method) 700 in accordance with another example embodiment of the present invention. The method 700 may comprise a step (or state) 702, a step (or state) 704, a step (or state) 706, and a step (or state) 708. In the step 702, the process 700 may begin by generating an input signal in response to a received signal and a feedback signal. In the step 704, the process 700 may generate a plurality of delayed versions of the input signal. In the step 706, the process 700 may generate the feedback signal in response to the plurality of delayed versions of the input signal and a plurality of respective tap weights. In one example, the process 700 may multiply each of the plurality of delayed versions of the input signal by the respective tap weight and use the sum of the products as the feedback signal. In the step 708, the process 700 may generate a data signal in response to the input signal and a clock signal.

Figure 11:
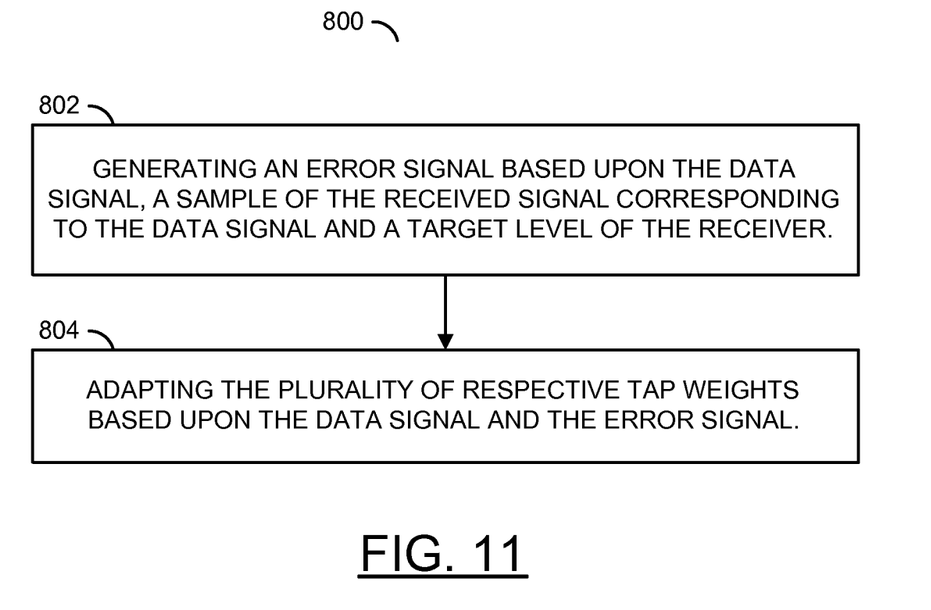
FIG. 11 is a flow diagram illustrating an adaptation process in accordance with an example embodiment of the present invention.

Referring to FIG. 11, a flow diagram is shown illustrating a adaptation process (or method) 800 in accordance with another example embodiment of the present invention. The method 800 may comprise a step (or state) 802 and a step (or state) 804. In the step 802, the process 800 may generate an error signal (e.g., EK) based upon the data signal DK, a sample of the equalized received signal corresponding to the data signal YK and a target level of the receiver (e.g., H0). In the step 804, the process 800 may adapt the tap weights F1, F2, ..., FM based upon the data signal DK and the error signal EK. The processes 700 and 800 may be performed simultaneously (or in parallel).

The delay line feedback equalizer examples in accordance with the example embodiments of the present invention may be implemented similarly to a digital DFE with the exception that instead of feeding back decisions, delayed versions of the signal Y0(t) may be fed back. Because no decision needs to be made to be fed back, the feedback latency is greatly reduced. In one example, inductors may be used to implement delay elements of a delay line feedback equalizer in accordance with embodiments of the present invention. The use of inductors to provide the delay may become more attractive as the data rate increases, since the size of the inductors may be reduced. Alternative ways to implement the delay elements may include, but are not limited to, the use of active devices and/or transmission lines. Since many taps may be implemented, the delay line feedback equalizer in accordance with embodiments of the present invention may provide an equalizer that has more degrees of freedom. More degrees of freedom may allow the delay line feedback equalizer in accordance with embodiments of the present invention to equalize not only smooth channels, but also channels with reflections within the range covered by the delay elements of the delay line. In general, M (or m) is used to represent the number of taps implemented in the delay line feedback equalizer and the term n is used to represent the number of slicers and clocks implemented. The use of the terms M (or m) and n is meant to distinguish between two numbers and is not meant to indicate that the numbers must be different.

Compared to standard DFE, the delay line feedback equalizer implemented in accordance with the present invention generally does not have the first tap feedback latency problem. The power consumption of the delay line feedback equalizer implemented in accordance with the present invention may be much less when compared to an unrolled DFE. The delay line feedback equalizer implemented in accordance with the present invention may handle channels that are more bumpy when compared to linear equalizers.

The functions performed by the diagrams of FIGS. 9 and 10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
an adder having a first input configured to receive an analog input signal, a second input configured to receive a feedback signal and an output configured to present an analog intermediate signal in response to said analog input signal and said feedback signal, wherein the feedback signal comprises a contribution from each of a plurality of delayed versions of said analog intermediate signal, and the contribution from each of said plurality of delayed versions of said analog intermediate signal is determined by a respective weight value;
a delay line configured to generate said plurality of delayed versions of said analog intermediate signal; and
a first detector configured to recover a digital data sample from said analog intermediate signal in response to a first clock signal.

2. The apparatus according to claim 1, wherein said delay line comprises a plurality of delay elements.

3. The apparatus according to claim 2, wherein said plurality of delay elements comprises a transmission line.

4. The apparatus according to claim 2, wherein each of said plurality of delay elements comprises an inductor.

5. The apparatus according to claim 1, wherein said feedback signal is generated by combining each of said plurality of delayed versions of said analog intermediate signal weighted by said respective weight value.

6. The apparatus according to claim 1, further comprising:
a plurality of multipliers configured to weight each of said plurality of delayed versions of said analog intermediate signal based upon said respective weight values.

7. The apparatus according to claim 1, further comprising:
an adaptation loop configured to adjust said respective weight values based upon a prior digital data sample and an error signal, wherein said error signal is based upon a comparison of said analog intermediate signal and a current digital data sample.

8. The apparatus according to claim 1, wherein said apparatus is part of a receiver.

9. The apparatus according to claim 1, wherein said apparatus is implemented as one or more integrated circuits.

10. The apparatus according to claim 1, further comprising one or more additional detectors configured to recover one or more additional data samples from said analog intermediate signal in response to one or more additional clock signals.

11. The apparatus according to claim 10, wherein said one or more additional clock signals have phase offsets with respect to said first clock signal.

12. An apparatus comprising:
a delay line comprising a plurality of delay elements, wherein said delay line generates a plurality of delayed versions of an analog intermediate signal;
an adder configured to generate said analog intermediate signal in response to an analog input signal and a feedback signal comprising a plurality of delayed versions of said analog intermediate signal, wherein a contribution of each of said plurality of delayed versions of said analog intermediate signal to said feedback signal is determined by a respective weight value;
a first detector configured to recover a digital data sample from said analog intermediate signal in response to a clock signal; and
a second detector configured to recover a sample of a zero crossing of said analog intermediate signal in response to said clock signal.

13. The apparatus according to claim 12, wherein said zero crossing precedes said data sample.

14. The apparatus according to claim 13, wherein said second detector recovers said sample of said zero crossing from one of said plurality of delayed versions of said analog intermediate signal.

15. The apparatus according to claim 12, wherein said data sample precedes said zero crossing.

16. The apparatus according to claim 15, wherein said first detector recovers said data sample from one of said plurality of delayed versions of said analog intermediate signal.

17. A method of adaptation of a delay line decision feedback equalizer comprising the steps of:
generating an analog intermediate signal in response to an analog input signal and a feedback signal;
generating a plurality of delayed versions of said analog intermediate signal;
generating said feedback signal in response to said plurality of delayed versions of said analog intermediate signal, wherein a contribution of each of said plurality of delayed versions of said analog intermediate signal to said feedback signal is determined by a respective weight value; and
recovering a data sample from said analog intermediate signal in response to a clock signal.

18. The method according to claim 17, further comprising sampling a zero crossing of said analog intermediate signal in response to said clock signal.

19. The method according to claim 18, wherein either the data sample or the sample of the zero crossing is generating in response to one of said delayed versions of said analog intermediate signal.

20. The method according to claim 17, further comprising:
adapting said respective weight values based upon a prior data sample and an error signal, wherein said error signal is based upon a comparison of said analog input signal and a current data sample.

* * * * *